Feb. 21, 1928.
F. H. GERDEMAN
1,659,685
AGRICULTURAL IMPLEMENT
Filed Jan. 13, 1927    2 Sheets-Sheet 1
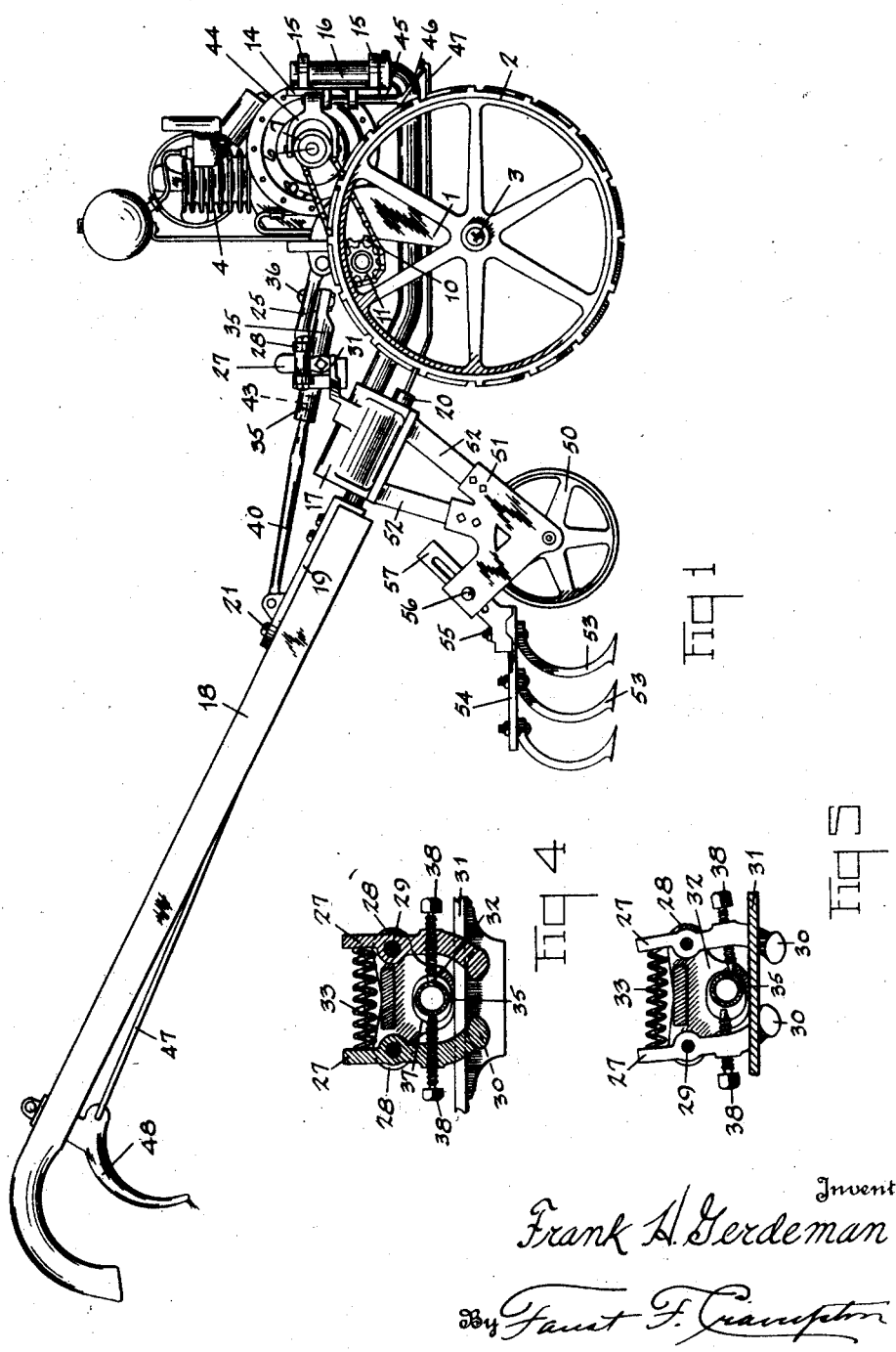
Inventor
Frank H. Gerdeman
By Faust F. Crampton
Attorney Feb. 21, 1928.
F. H. GERDEMAN
1,659,685
AGRICULTURAL IMPLEMENT
Filed Jan. 13, 1927  2 Sheets-Sheet 2
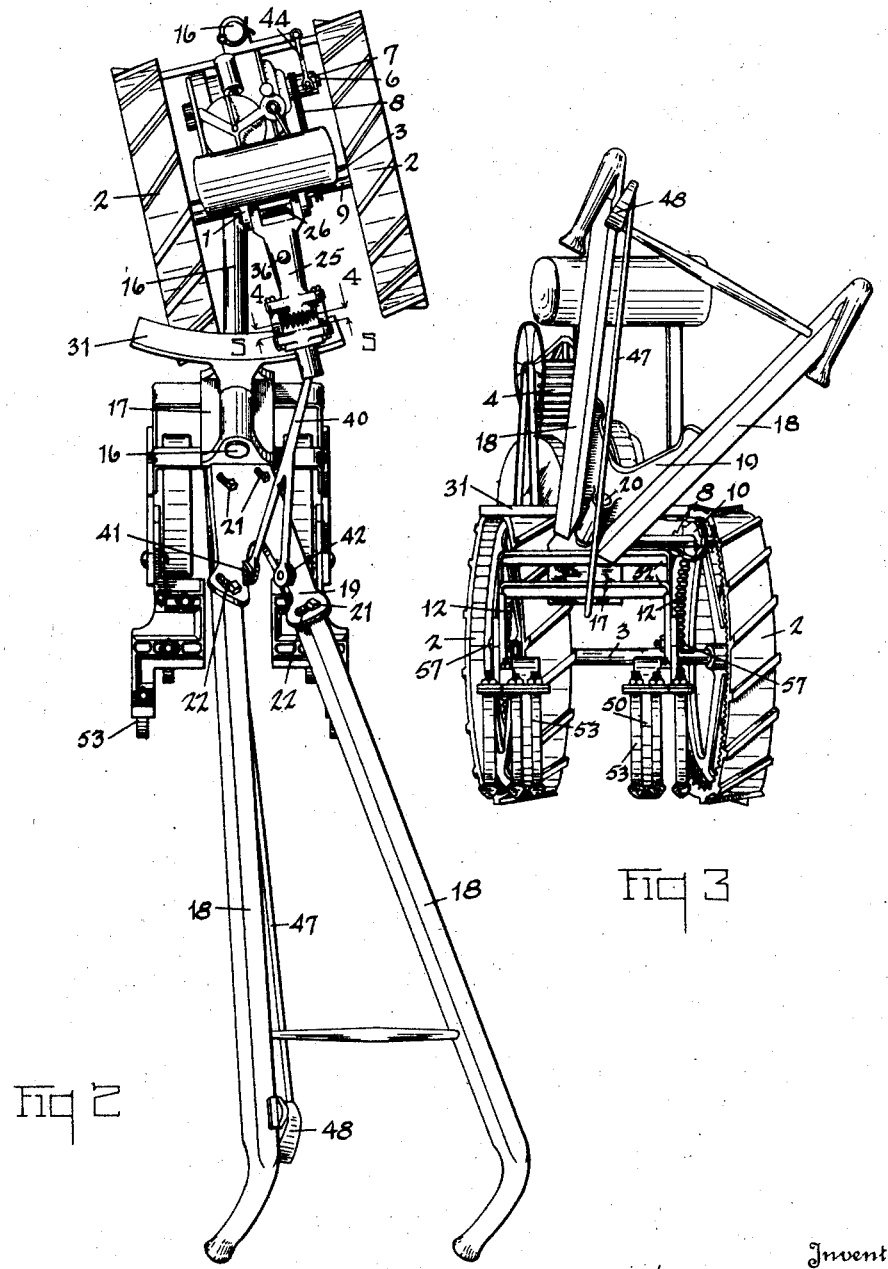
Inventor
Frank H. Gerdeman.
By Fahet F. Crampton
Attorney Patented Feb. 21, 1928.

1,659,685

UNITED STATES PATENT OFFICE.

FRANK H. GERDEMAN, OF FINDLAY, OHIO.

AGRICULTURAL IMPLEMENT.

Application filed January 13, 1927. Serial No. 160,796.

My invention has for its object to provide an agricultural implement which is automotive in character and that may be guided by handles and the driving means controlled at a point remote from the driving means and preferably at the handles. Any suitable soil manipulating member or members may be connected to the implement whereby the soil may be cultivated or plowed or the surface of the soil may be raked or vegetation may be treated in any manner desired.

The invention may be contained in agricultural implements of different forms and may be used agriculturally for a great variety of purposes as well as general draft purposes for drawing loads. To illustrate a practical application of the invention, I have selected one of such structures as an example of embodiments of my invention and its practical application and shall describe it hereinafter. The structure selected, for purposes of illustration, is shown in the accompanying drawings.

Fig. 1 of the drawings is a side view of an agricultural implement embodying my invention. Fig. 2 is a top view of the instrument shown in Fig. 1 and illustrates the manner in which the implement is guided in its movement over the ground. Fig. 3 is a rear view of the agricultural implement when the parts shown in Fig. 2 are in the positions as therein indicated. Fig. 4 is a view of a section taken on the plane of the line 4—4 indicated in Fig. 2. Fig. 5 is a view of a section taken on the plane of the line 5—5 indicated in Fig. 2.

In the construction shown in the drawings, a frame 1 is supported by means of a pair of traction wheels 2. The frame 1 being provided with an axle 3 to which the traction wheels 2 are rotatably connected. An engine 4 is supported on the frame 1 and the shaft 6 of the engine is connected through a clutch member 7 and a chain 8 to a shaft 9 so that when the clutch member 7 is in closed position the chain 8 will operate upon the sprocket wheel 10 to cause the rotation of the shaft 9 in the manner well known in the art. The shaft 9 is rotatably supported in the frame 1 and is provided with pinions 11 that mesh with internal gears 12 formed on the traction wheels 2 whereby the traction wheels 2 will be driven to cause the movement of the agricultural implement over a surface on which it is located, such as over the ground. Any suitable arrangement may be provided for driving the traction wheels.

The frame 1 is provided with a bracket 14 that may be formed integral with the frame 1 or may be suitably secured thereto. The bracket 14 has a pair of ears 15 and a bar that may be solid or tubular in form, has a portion that extends vertically through the ears 15 whereby the frame 1, together with the parts connected thereto, namely, the engine 4 and the traction wheels 2, and the interconnecting driving mechanism may be rotated horizontally on the vertical axis of the portion of the bar that extends through the ears 15. In the form of construction the bar 16 is bent upwardly to receive the ears 15 while the body of the bar extends rearwardly with respect to the machine. If desired a frame, having an upwardly extending shaft or spindle on which the frame 1 is angularly moved, may be used in place of the bar.

The bar 16 is connected to a frame 17. A pair of guide handles or guide bars 18 are connected together by means of a plate 19 and they are pivotally supported in the frame 17 by a pin 20 that protrudes from the end of the plate 19. The guide handles 18 may be adjustably secured to the plate 19 by means of the screw bolts 21 that extend through slots 22 formed in the plate 19. The guide handles 18 may be raised or lowered to properly manipulate the agricultural instrument that may be connected to the frame 17 and, moreover, are so connected to the frame 1 as to cause traction wheels 2 to move angularly with respect to the frame 17. Thus the agricultural implement and also the direction of the traction may be controlled by the handles.

The frame 1 has an arm 25 that is pivotally connected to the frame by means of the pin 26. A pair of dogs 27 are pivotally connected between ears 28 by means of the pins 29. The dogs 27 have rearwardly extending lugs 30 that are located beneath the forwardly extending flange 31 formed on the top of the frame 17. The arm 25 has a downwardly extending portion 32 that is located on the top of the flange 31. The flange 31 extends in the form of an arc on opposite sides of the frame 17, the arc having a center in the vertical axis of the upwardly extending forward portion of the bar 16 and so that when the frame 1, together with the traction wheels 2 and the engine is moved angularly on the forward end of the bar 16, the lugs 30 of the dogs 27 are moved beneath and along the flange 31 while the downwardly extending portion of the arm 25 will ride on the upper surface of the flange 31, unless the dogs lock the arm 25 to the flange 31.

The dogs 27 are provided with a compression spring 33 that operates to press the upper ends of the dogs outwardly with respect to the pivot pins 29 and so as to cause the lugs 30 to clamp the flange 31 against the portion 32 of the arm 25. The lugs 30 may be made cam shaped and so as to grip the flange 31 when a force is applied to the frame 1 to swing it about the upwardly extending portion of the forward end of the bar 16. Such a force might be a ridge that one of the traction wheels would strike at an angle, or a stone or other obstacle that might otherwise cause deflection in the direction of the draft of the traction wheels. In order to change the direction of movement of the agricultural implement, one of the dogs 27 is released from its engagement with the flange 31. The flange 31 can then be moved past the other dog but in a direction away from the dog that has been released and towards the other dog. The lugs 30 are normally held by the spring 33 at points that are well within the vertical planes passing through the axis of the pins 29 and the lug 30 of the dog 27 that is released will be swung to a point below and away from the under side of the flange 31. The arm 25 may then be moved toward that side of the agricultural implement on which the dog that has been released is located. Since the other dog 27 will move freely over the flange when the arm is moved in that direction. In order to release one or the other of the dogs 27 to permit lateral movement of the arm 25 to guide the agricultural implement, a sleeve 35 is pivotally connected to the arm 25 by means of the pin 36. The sleeve 35 extends through the downwardly extending portion 32 of the arm 25, which is provided with an oblong slot 37 to permit lateral movement of the free end of the sleeve 35 within that portion of the arm 25 and a pair of bolts 38 are located in the dogs 27 below their pivot pins 29 and so that their ends will contact against opposite sides of the sleeve 35. When the sleeve 35 is moved angularly with respect to the arm 25, it will press against one or the other of the ends of the bolts 38 and release the dog having that bolt from the flange 31. The plate 19, to which the guide handles 18 are connected, has a bar 40 that extends into the end of the sleeve 35. The bar 40 is pivotally connected to the plate 19. Preferably the bar 40 is a Y-bar and the arms of the Y are pivotally connected to two points, axially in alignment, on the plate 19, as at 41 and 42. If desired, the end of the bar 40 may be provided with a ball 43, as indicated in Fig. 1. The ball 43 is also, preferably, the same size in diameter as the inner diameter of the sleeve 35 in order that there will be substantially a constant contact between the ball and the inner cylindrical surface of the sleeve when the angular relations, within the limitations of the structure, are changed, when guiding the agricultural implement. When, therefore, it is desired to move the frame 1 angularly about the upwardly extending portion of the bar 16, the handles 18 are rotated in the frame 17 which operates to throw the bar 40 to one side since it is located well above the pivot pin 20. This operates to move the sleeve 35 laterally with respect to the arm 25 and releases one of the dogs 27. On continued rotation of the handles 18, the bar 40 pushes the arm 25 in the same direction that the sleeve 35 was moved and along the flange 31. This moves the frame 1 and the parts connected thereto, namely, the traction wheels 2 and the engine 4, angularly about the upwardly extending portion of the bar 16. This will cause the agricultural implement to be drawn at an angle to the direction of its movement just prior to the rotation of the guiding handles in the frame 17. The agricultural implement will be drawn on a curve by the tractor part. To again bring the implement in line with the tractor part, the handles 18 are tilted in the opposite direction which first releases one of the dogs and then moves the tractor frame to alignment with the implement frame. Thus the implement may be guided in its operations and also the agricultural implement will be controlled by the handles.

For convenience of operation, the clutch 7 may be operated at a point remote from the engine 4, preferably at a point in close proximity to the handles of the agricultural implement. The clutch 7 may be operated by means of a yoke 44 that is supported on the upper end of the pivoted rod 45 that has an arm 46. The arm 46 is connected by a rod 47 to a pivoted handle 48 located on one of the handles 18 of the agricultural implement whereby the connection between the engine and the traction wheels may be connected and disconnected.

Also, if desired, the frame 17 may be supported by a pair of wheels 50 that are supported in a frame 51, which are connected to the frame 17 by suitable bars 52. The agricultural implement, such as the cultivators 53, may be connected to plates 54 and the plates may be adjustably connected to the frame 51 by means of the bolts 55 and 56 and the slotted arms 57.

I claim:

1. In an agricultural implement, a frame, a second frame pivotally connected to the first named frame, a pair of traction wheels rotatably connected to the second frame, means supported on the second frame for driving the traction wheels, guide handles pivotally connected to the first named frame, an arm connected to the second frame, a dog for engaging the first frame and located on the said arm, means operated by the handles for releasing the said dog, and for moving the second frame relative to the first frame.

2. In an agricultural implement, a frame, a second frame pivotally connected to the first named frame, a pair of traction wheels rotatably connected to the second frame, means supported on the second frame for driving the traction wheels, guide handles pivotally connected to the first named frame, a dog connected to the second frame and adapted to engage the first frame to lock the said frames together and means operated by the guide handles for releasing the dog and pivotally moving the second frame relative to the first named frame.

3. In an agricultural implement, a frame, a second frame pivotally connected to the first named frame, a pair of traction wheels rotatably connected to the second frame, means supported on the second frame for driving the traction wheels, guide handles pivotally connected to the first named frame, the first frame having an arcuate flange, the second frame having an arm, a dog located on the said arm for engaging the flange to lock the arm to the flange and means operated by the handles for releasing the dog from the flange.

4. In an agricultural implement, a frame, a second frame pivotally connected to the first named frame, a pair of traction wheels rotatably connected to the second frame, means supported on the second frame for driving the traction wheels, guide handles pivotally connected to the first named frame, the first named frame having an arcuate flange, the second frame having an arm, a dog located on the said arm for engaging the flange to lock the arm to the flange, means operated by the handles for releasing the dog from the flange and for laterally moving the arm to rotatably move the second frame relative to the first named frame.

5. In an agricultural implement, a frame, a second frame pivotally connected to the first named frame, a pair of traction wheels rotatably connected to the second frame, means supported on the second frame for driving the traction wheels, guide handles pivotally connected to the first named frame, an arcuate flange connected to the first named frame, a pair of dogs connected to the second named frame for engaging the said flange, one of the dogs operating to prevent movement of the second frame in one direction relative to the first named frame and the other dog for preventing movement in the other direction, a member pivotally connected to the second named frame for releasing one or the other of the dogs, an arm connected to the guide handles for operating the said member and for moving the said second frame relative to the first named frame.

In witness whereof I have hereunto signed my name to this specification.

FRANK H. GERDEMAN.